Patented May 20, 1924.

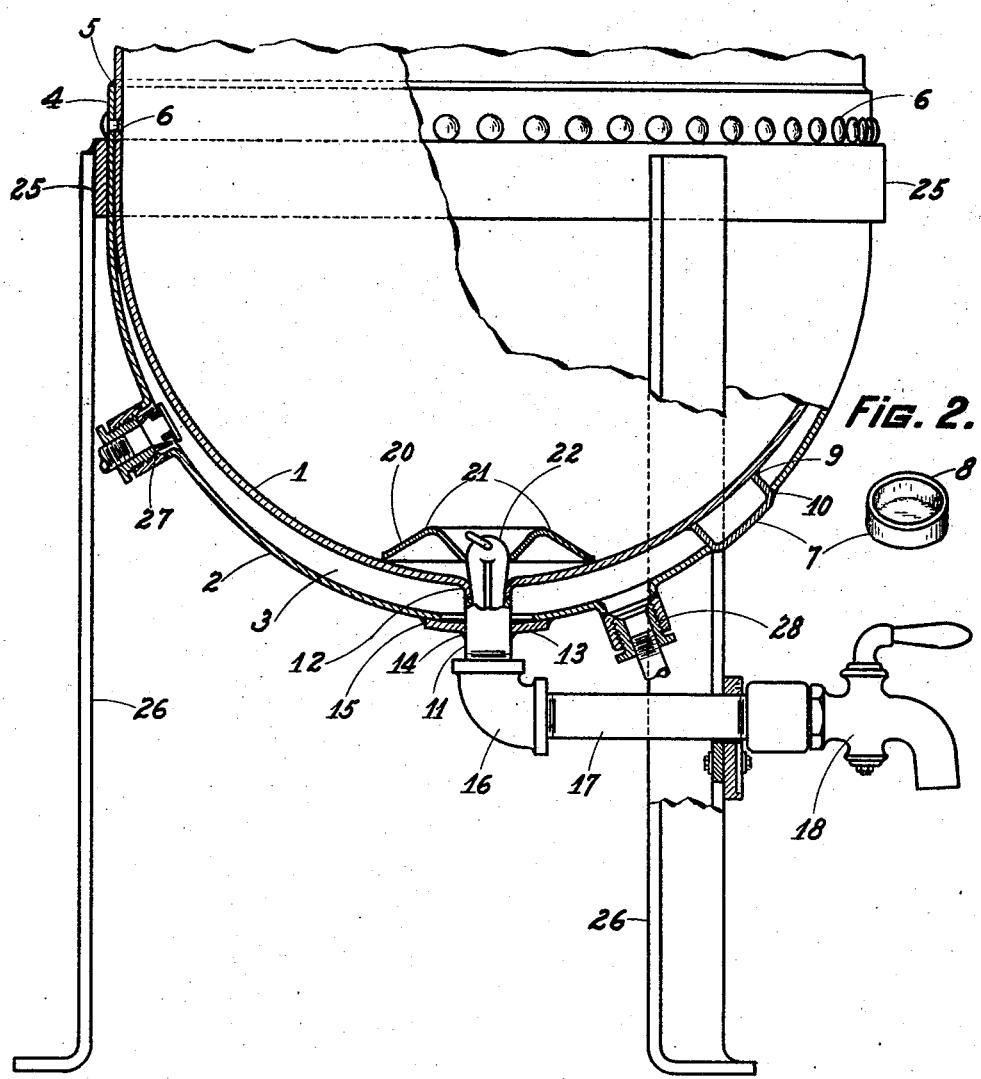

1,494,979

UNITED STATES PATENT OFFICE.

ROBERT FLOYD SALISBURY, OF NEW KENSINGTON, PENNSYLVANIA, ASSIGNOR TO ALUMINUM COMPANY OF AMERICA, OF PITTSBURGH, PENNSYLVANIA, A CORPORATION OF PENNSYLVANIA.

STEAM-JACKETED KETTLE.

Application filed March 20, 1922. Serial No. 545,389.

*To all whom it may concern:*

Be it known that I, ROBERT F. SALISBURY, a citizen of the United States, and a resident of New Kensington, in the county of Westmoreland and State of Pennsylvania, have invented a new and useful Improvement in Steam-Jacketed Kettles, of which the following is a specification.

This invention relates to kettles and particularly to steam jacketed kettles in which the inner and outer shells comprising the walls of the same are spaced apart to provide a steam chamber therebetween.

Kettles of the class referred to are most frequently made of cup shaped shells, the bottom portions of which are of somewhat different curvatures, and the sides of which at some distance above the bottoms assume substantially the same curvature so as to contact throughout an annular zone. Heretofore the practice has been to rivet the two shells together in this zone, frequently with an interposed film of red lead or asbestos fibre, in an attempt to form a satisfactory joint to prevent, under service conditions, the escape of the heating medium admitted to the chamber formed between the shells.

Experience has taught that with a construction as above described, and due to the variations in expansion and contraction of the two shells caused by changes and differences in the temperature to which they are subjected, a decided shearing action is exerted upon the rivets, which in course of time terminates in the rupture of the shells adjacent to the rivets, the breakage of the rivets themselves, or a distortion of the parts, permitting leakage. On account of the fact that the joint between the shells is accomplished by merely binding the shells into intimate contact, as above described, it is very difficult to prevent leakage therebetween unless the shells are made to contact throughout a large area, which necessitates the employment of a plurality of rows of rivets or such close spacing thereof as to weaken the metal of the shells, either construction requiring the use of a large number of rivets. Frequent attempts to find a suitable substitute for such methods of joining the shells, such as the welding or similar means, have been made but have proved unsuccessful. The welded joint alone although effective as a seal does not withstand the tendency of the shells to separate under the pressure of the heating fluid employed in kettles of medium or large capacities, and this is particularly true when dealing with shells made of metals having the physical characteristics of aluminum.

I have found that by welding the shells together throughout a line of contact and employing a single row of rivets, or rivets widely spaced, and positioning them comparatively close to the weld, an effective sealed joint may be obtained. The weld not only acts as an effective seal but eliminates the existence of the film of air normally present between the abutting surfaces of the shells which acts as a heat insulator, even in constructions where no special packing possessing heat insulating properties is employed, so that conduction of heat from one shell to the other takes place in substantially the same manner as if the shells were formed of a single piece of metal. This assures an almost equal degree of expansion or contraction in the two shells in the region of their welded joint regardless of the changes and variations in temperature, and eliminates the shearing action due to such differences in expansion and contraction, as previously noted. The tendency to shear is also reduced by placing the rivets comparatively close to the weld so that any difference in the rate of expansion or contraction between the shells in said region that might occur will normally result in a negligible shearing effect on account of the small extent of metal between the line of welded contact and the rivets. Furthermore, the elimination of the shearing action upon the rivets necessitates the employment of a smaller number thereof, or a single row instead of a plurality of rows. And still further, the use of a single instead of a plurality of rows, does away with any buckling between the rows which tends to separate and distort the parts.

The object of this invention is to provide a kettle of the kind referred to which is free of the disadvantages above noted arising from the employment of the types of riveted joints mentioned for uniting the shells. It is also an object to provide a kettle in which the shells and rivets for binding the same in contact are of the same metal for the purpose of eliminating the electrolytic or other similar action resulting in corrosion between the parts when metals of different kinds are employed.

It is still a further object to provide a steam jacketed kettle in which the body portions of the shells are connected by stay-tubes of novel form having closed bottoms which lie substantially flush with the exterior of the outer shell and welded thereto, thereby not only preventing leakage but adding to the general appearance of the kettle. It is also an object to construct the stay-tubes as well as the rivets and shells of the same metal, preferably aluminum, so as to eliminate corrosion between the joints, as previously pointed out in connection with the welded joint between the two shells.

These and other objects of the invention will more readily appear when taken in connection with the following description and appended claims.

In the accompanying drawings Fig. 1 is a fragmentary vertical sectional view with parts in elevation illustrating the preferred embodiment of the invention; and Fig. 2 is a perspective view of one of the stay-tubes connecting the inner and outer walls of the kettle.

In the embodiment illustrated, 1 and 2 represent the inner and outer curved shells or walls of the kettle, the bottom portions of which are spaced apart to form a steam heating chamber 3 therebetween. The shapes of the shells are such that the inner peripheral edge 4 of the outer shell conforms to the curvature and is adapted to contact the exterior of the inner shell throughout an annular zone in proximity to the said edge. The edge of the shell 2 is welded to the shell 1 as indicated at 5 so as to form a hermetically welded joint, and the two shells are bound into intimate contact by a single row of spaced rivets 6 disposed close to the line of the welded connection.

The welded joint 5 performs a double function. In the first place, it forms a welded joint preventing the escape of the heating fluid between the shells, and in the second place, it eliminates special packings or the heat insulating air film, previously mentioned, so that heat is readily conducted from one shell to the other. This results in keeping the two shells adjacent their welded connection at substantially the same temperature, eliminating differences in expansion and contraction in the two shells at that region together with the consequent shearing effect upon the rivets used for binding the walls together. Furthermore, the line of rivets 6 is placed so close to the welded joint 5 that a very small expanse of metal lies between the two, thereby also lessening whatever small shearing action that might still be exerted.

The bottom portions of the two shells are connected at intervals by a plurality of stay-tubes 7 preferably equally spaced apart, only one of which however is shown in the drawings. The form of the stay-tube is cup-shaped, as clearly shown in Fig. 2, and the raw edge 8 of the lip at its open end is shaped to conform to the curvature of the inner shell so as to properly seat thereon when in the position shown in Fig. 1, said lip being welded to the inner shell throughout their line of contact 9. The bottom portion of the tube opposite its open end is completely closed and is adapted to project into and fill an aperture in the outer shell, said tube and outer shell being welded throughout their line of contact as indicated at 10. In this manner the stay-tube is firmly united with the shells by hermetically sealed joints, and due to the fact that the bottoms of the tubes are completely closed, even if leakage should occur at the joint 9 escape of the heating fluid would be prevented by the joint 10, and in addition the whole exterior of the kettle is greatly improved in appearance.

It has been found that when the walls of the kettle are made of aluminum and the rivets or stay-tubes are made of a different metal, such as brass, an electrolytic or other similar action is set up which results in a pronounced corrosion at the joints formed between the contacting parts of different metals. Not only the walls of the kettle but also the rivets 6 and tubes 7 are therefore made of the same metal.

The main outlet for the kettle is formed by welding a tube 11 to an annular flange 12 surrounding an aperture in the shell 1, the tube 11 projecting outwardly through an aligned opening in the shell 2 which is closed by means of welding a disk 13 to the tube and outer shell, as indicated at 14 and 15, respectively. The extremity of the outlet tube is threaded and has attached thereto by means of an elbow 16 a drain pipe 17 provided with a drain cock 18 at its discharge end. The outlet is preferably equipped with a strainer plate 20 perforated at 21 which is supported by resting at its periphery upon the wall 1 and having a central aperture the edge of which engages the lateral ribs of a supporting cross indicated at 22. The supporting cross 22 is longitudinally tapered and is adapted to be positioned by merely placing the same within the aperture of the inner shell. In this manner both the cross and the strainer plate may be easily retained in position but readily removed whenever desired.

The kettle is supported in any suitable manner such as by a ring 25 embracing the kettle and attached to the upper ends of a plurality of spaced legs 26, as shown in Fig. 1. Steam is supplied to the heating chamber 3 through a suitably constructed inlet 27 and exhausted through a similar outlet 28.

It is thus seen that the invention provides a steam jacketed kettle accomplishing the objects above enumerated in a simple and efficient manner, and provides a durable structure not liable to be disrupted and which does not become corroded at the joints between the several parts.

I claim:

1. A steam jacketed kettle comprising an inner shell, an outer shell embracing the same but spaced therefrom to form a steam space between the two, and a stay-tube of cup form connecting the two shells, the edge of its lip at the open edge of the tube conforming to and contacting the outer face of the inner shell and welded thereto, the closed end of the tube projecting through an aperture in the outer shell and connected therewith also by welding.

2. A steam jacketed kettle comprising an inner shell, an outer shell spaced therefrom to form a steam chamber therebetween and provided with an aperture, a cup-shaped stay-tube having its peripheral lip hermetically attached to the inner shell and its body portion filling the said aperture, said body portion and the outer shell being hermetically joined.

3. A steam jacketed kettle comprising an inner shell, an outer shell provided with an aperture and spaced from the first named shell to form a steam chamber, a cup-shaped stay-tube having its open end welded to the inner shell and its body portion projecting into and filling the said aperture, the closed bottom of the tube lying substantially flush with the exterior of the outer shell, the outer shell and tube being united by welding.

4. A steam jacketed kettle comprising an inner shell, an outer shell provided with an aperture, the shells being spaced to provide a steam chamber therebetween, a cup-shaped stay-tube having the raw edge at its open end conforming to and adapted to seat upon the convex surface of the inner shell, the cross sectional shape of the body of the tube corresponding to that of the aperture and adapted to fill the same, both shells being welded to the tube adjacent their entire line of contact, the shells and tube being made of the same metal.

5. A steam jacketed kettle comprising an inner shell, an outer shell provided with an aperture, the shells being spaced to provide a steam chamber therebetween, a cup-shaped stay-tube having the raw edge of its open end conforming to and adapted to seat upon the convex surface of the inner shell, the closed end of the tube projecting into and filling the said aperture, both said shells being welded to the tube adjacent their entire line of contact, the shells and tube being made of aluminum.

6. A steam jacketed kettle comprising an outer curved shell having a peripheral margin and provided with an aperture through the body thereof, an inner curved shell disposed within the outer shell and spaced therefrom except in the region of said margin to provide a steam chamber, the inner shell contacting the portion of the outer shell adjacent its margin and united to its raw edge by welding, a series of spaced rivets uniting the two shells in proximity to their welded connection, a cup-shaped stay-tube having its open end conforming to and adapted to rest upon the convex surface of the inner shell, the closed end of which lies flush with the exterior of the outer shell, and fits the said aperture, both said shells being hermetically connected to the tube by welding adjacent and throughout their entire line of contact.

In testimony whereof, I sign my name.

ROBERT FLOYD SALISBURY.

Witnesses:
   Jos. T. Weinzierl,
   P. B. Hetrick.